United States Patent
Stark et al.

[19]
[11] Patent Number: 6,131,259
[45] Date of Patent: Oct. 17, 2000

[54] DRILLING AND MILLING MECHANISM FOR MACHINING MATERIAL RODS

[75] Inventors: Gerhard Stark, Notzingen; Pavel Blazek, Albershausen, both of Germany

[73] Assignee: Stama Maschinenfabrik GmbH, Germany

[21] Appl. No.: 09/214,339

[22] PCT Filed: Aug. 25, 1997

[86] PCT No.: PCT/EP97/04613

§ 371 Date: Jan. 4, 1999

§ 102(e) Date: Jan. 4, 1999

[87] PCT Pub. No.: WO98/08648

PCT Pub. Date: Mar. 5, 1998

[30] Foreign Application Priority Data

Aug. 30, 1996 [DE] Germany .......................... 196 35 258

[51] Int. Cl.[7] .................................................. B23B 3/26
[52] U.S. Cl. ........................................... 29/27 R; 409/198
[58] Field of Search .................................. 29/26 A, 26 R, 29/27 R, 38 A, 38 B; 408/89; 409/164, 165, 198, 82, 127

[56] References Cited

U.S. PATENT DOCUMENTS

| | | | |
|---|---|---|---|
| 3,657,963 | 4/1972 | Miller | 90/58 C |
| 3,661,050 | 5/1972 | Erikson | 90/21 B |
| 4,217,800 | 8/1980 | Furegati | 82/2.5 |
| 4,529,342 | 7/1985 | Babel | 409/164 |
| 4,951,376 | 8/1990 | Grund | 29/568 |
| 5,025,539 | 6/1991 | Stark | 29/26 |
| 5,358,018 | 10/1994 | Holbert | 144/1 |
| 5,802,698 | 9/1998 | Fitzgerald et al. | 29/559 |
| 5,868,606 | 2/1999 | Martin | 451/48 |

FOREIGN PATENT DOCUMENTS

| | | | |
|---|---|---|---|
| 0368996 | 5/1990 | European Pat. Off. | B23Q 39/02 |
| 137546 | 9/1979 | Germany . | |
| 3151613 | 8/1982 | Germany | B23Q 17/04 |
| 616097 | 3/1980 | Switzerland | B23B 13/00 |
| 8911951 | 12/1989 | WIPO | B23Q 39/02 |

*Primary Examiner*—Stephen F. Gerrity
*Assistant Examiner*—Adrian M. Wilson
*Attorney, Agent, or Firm*—Webb Ziesenheim Logsdon Orkin & Hanson, P.C.

[57] ABSTRACT

A movable column is adjustable longitudinally and transversely in controlled fashion on a machine bed which defines a longitudinal direction and a transverse direction. A tool spindle is adjustable in controlled fashion on the movable column along a spindle axis normal to both the longitudinal direction and the transverse direction. A clamping axis is defined by a tool support which is rotationally adjustable in controlled fashion about this clamping axis and includes a clamping device through which a material rod can be pushed and in which it can be clamped. A front portion of the material rod, presenting the workpiece to be machined, is disposed within the working range of the tool spindle. A supply device is provided for pushing the material rod through the clamping device. The workpiece support is pivotable in controlled fashion about a pivot axis, normal to both the clamping axis and the spindle axis, in an area which reaches at least from a position of the clamping axis normal to the spindle axis to a position of the clamping axis parallel to the spindle axis. The machine bed includes a pivot space into which the end portion of the material rod remote from the workpiece to be machined can be swung. The supply device is movable into a position at which it does not obstruct the pivoting movement of the material rod.

6 Claims, 9 Drawing Sheets

DRILLING AND MILLING MECHANISM FOR MACHINING MATERIAL RODS

BACKGROUND OF THE INVENTION

The invention relates to a drilling and milling mechanism.

In a known drilling and milling mechanism (EP 0 368 996 B1) the clamping axis about which the workpiece support is adapted to be driven in rotation is oriented horizontally in a position determined by the arrangement of the machine bed and parallel to the longitudinal direction thereof. Accordingly, the material rod, the axis of which coincides with the clamping axis, always is oriented horizontally, parallel to the longitudinal direction of the machine bed. The tool spindle carried by the movable column is disposed perpendicularly and can be equipped successively with a plurality of tools, such as drilling or milling cutters for machining a workpiece which is embodied by a front end portion of a rod of material. The movable column is furnished, in addition, with a severing unit which operates independently of the tool spindle and serves to cut off the workpiece having been machined. A carriage which is independent of the movable column is displaceable in longitudinal direction of the machine bed, and a gripping and pivoting unit is mounted on the carriage. The gripping and pivoting unit comprises a chuck which can be utilized as brackets while the workpiece, still integral with the material rod, is being machined and which completely takes over the workpiece when it has been separated from the material rod so that its back can be machined by one or more tools arranged in consecutive order on the tool spindle. The chuck is pivotable about an axis which, for being normal to the clamping axis of the workpiece support and to the spindle axis, extends horizontally. For this reason even inclined cuts or bores, for instance, may be formed in the workpiece which is clamped in the chuck of the gripping and pivoting unit. However, once the workpiece has been transferred from the clamping means at the workpiece support to the chuck of the gripping and pivoting unit, the precision in machining achievable, generally, is not quite as high as before the transfer because inaccuracies may slip in during each workpiece transfer.

It is, therefore, an object of the invention to facilitate especially versatile machining of each respective front workpiece still linked to the material rod, when rods of material are processed in a drilling and milling mechanism while, at the same time, increasing the machining accuracy.

SUMMARY OF THE INVENTION

The object is met, in accordance with the invention, by the features presented in claim 1.

The invention makes it possible to move the workpiece which still is integral with the material rod and defined in position by the material rod alone, into any desired position obtainable by rotation about the clamping axis and pivoting about the pivot axis without having to loosen the original fixing of the material rod in the clamping means. As a consequence, the same high degree of precision is achievable in principle with all the working operations which are carried out by tools secured to the tool spindle, irrespective of the angle defined between the spindle axis and the clamping axis. As it is possible to vary this angle within a range of at least 90° while, at the same time, turning the workpiece about the clamping axis, if necessary, a workpiece originating from a square-section rod, for example, can be machined not only at its front end and the four longitudinal sides but to a great extent also at the rear, provided there still is a sufficiently strong link between the workpiece and the remainder of the material rod. This link ultimately can be severed by a tool secured on the tool spindle, for example a circular saw. During this time the clamping axis may be in a position parallel to the spindle axis. Thus a separate severing unit of the kind provided with the drilling and milling mechanism mentioned initially may be dispensed with.

For the reasons given, a drilling and milling mechanism according to the invention in most cases, furthermore, can do without a separate gripping and pivoting unit for machining of the rear of the workpieces. However, such a unit also may be provided in the same or a similar manner as illustrated in the cited EP 0 368 996 B1, the disclosure of which is herein incorporated by reference.

The pivot axis of the workpiece support may be disposed such that it crosses the clamping axis thereof at a distance. But, in general, it is easier to program control of the various machine motions if the pivot axis of the workpiece support intersects the clamping axis thereof, in other words if these two axes lie in the same plane.

Introducing material rods into the workpiece support can be facilitated if the drilling and milling mechanism according to the invention is developed further such that the workpiece support is pivotable into a receiving position at which the clamping axis is inclined downwardly, as seen in the direction in which the material rod is pushed through the clamping means, and a rod guide means which is inclined accordingly and leaves free the pivot space is positioned upstream of the workpiece support.

Finally, it is advantageous if the workpiece support is adapted to be driven in rotation about the clamping axis at a rotational speed which is sufficient for lathe work to be done.

BRIEF DESCRIPTION OF THE DRAWINGS

An embodiment of the invention will be described in greater detail below with reference to diagrammatic drawings, in which.

DESCRIPTION OF THE PREFERRED EMBODIMENT

Figure 1:
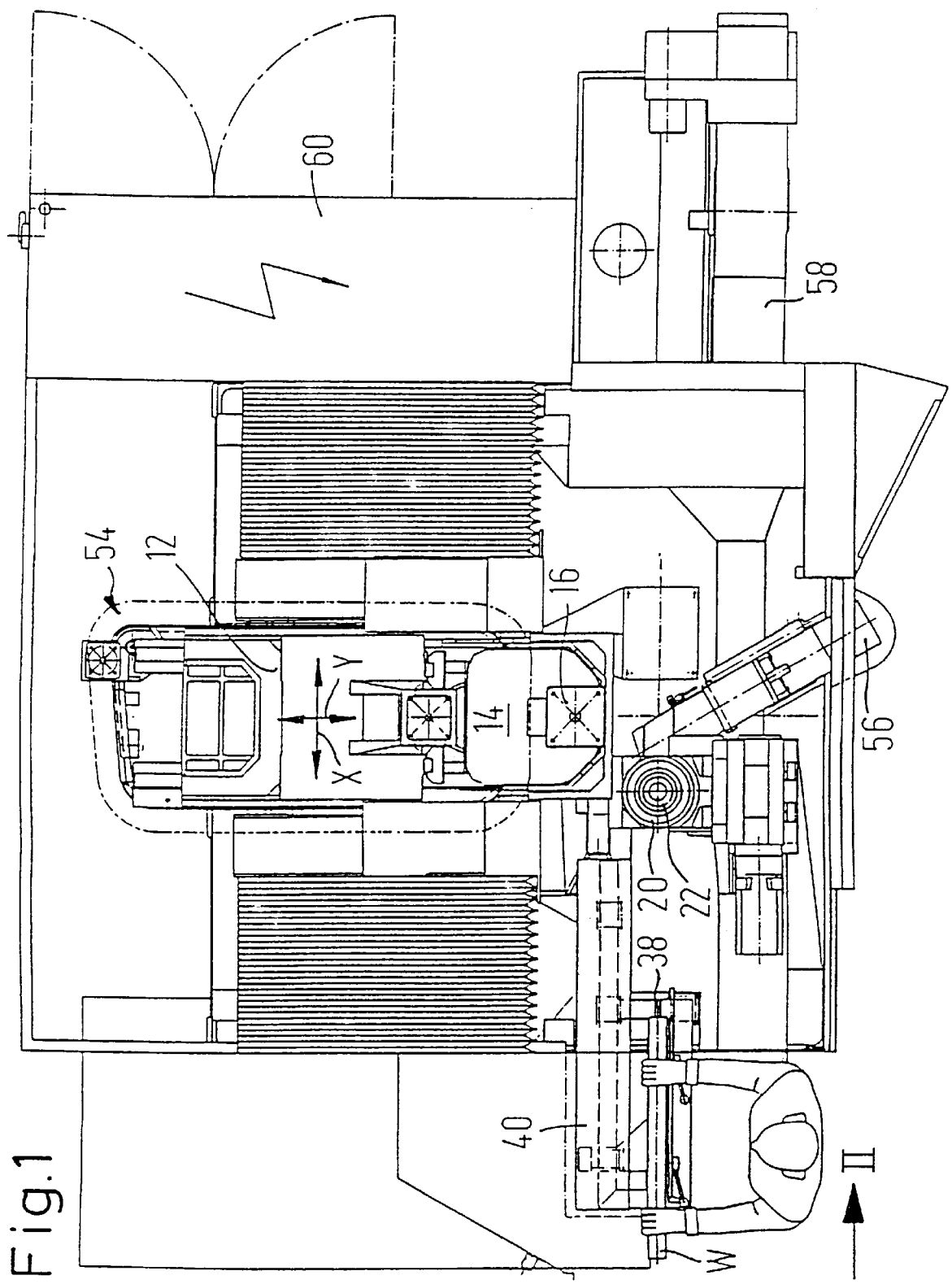
FIG. 1 is the top plan view of a drilling and milling mechanism according to the invention.
Figure 2:
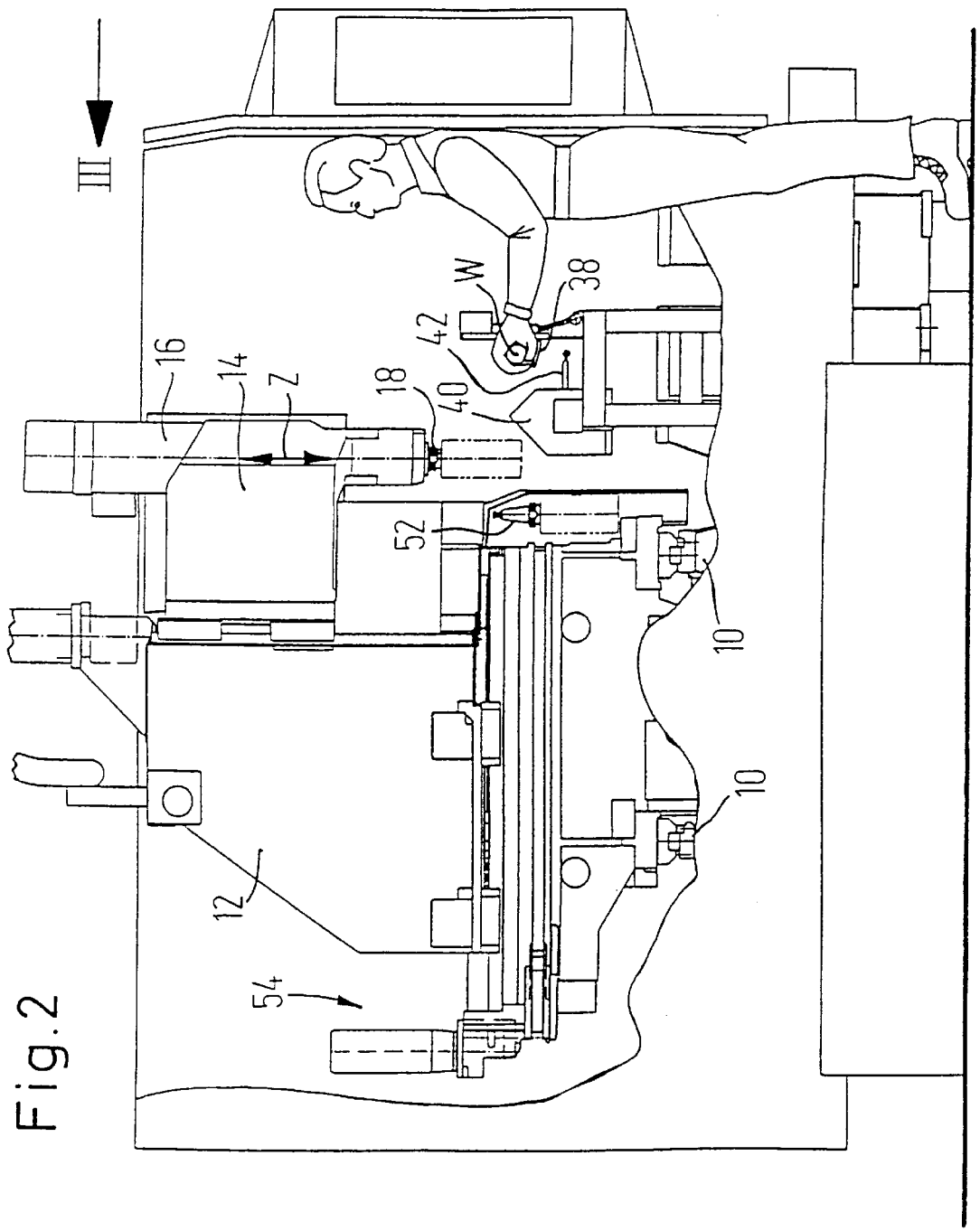
FIG. 2 is the side elevational view in the direction of arrow II in FIG. 1.
Figure 3:
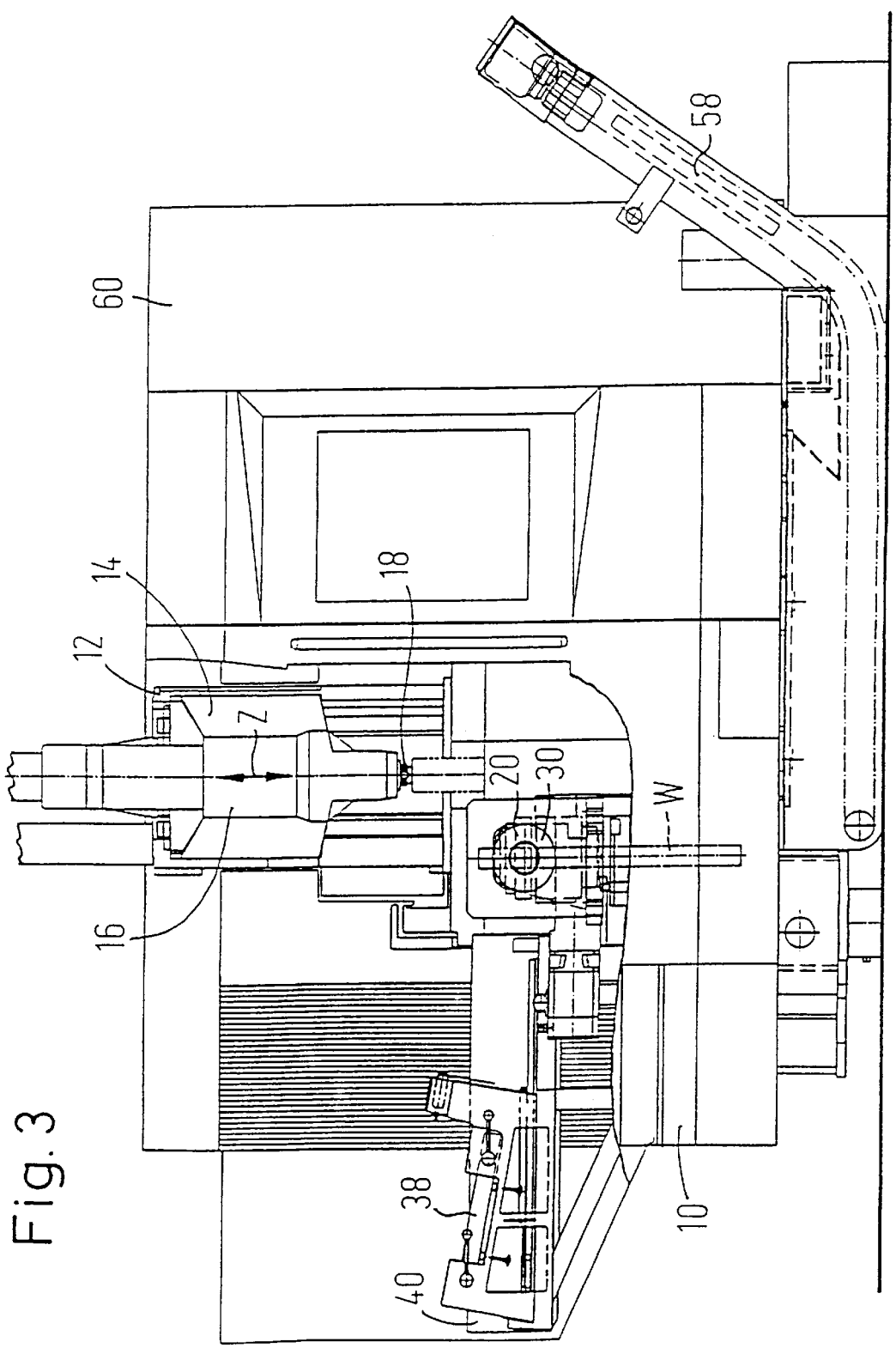
FIG. 3 is the front elevational view in the direction of arrow III in FIG. 2.
Figure 4:
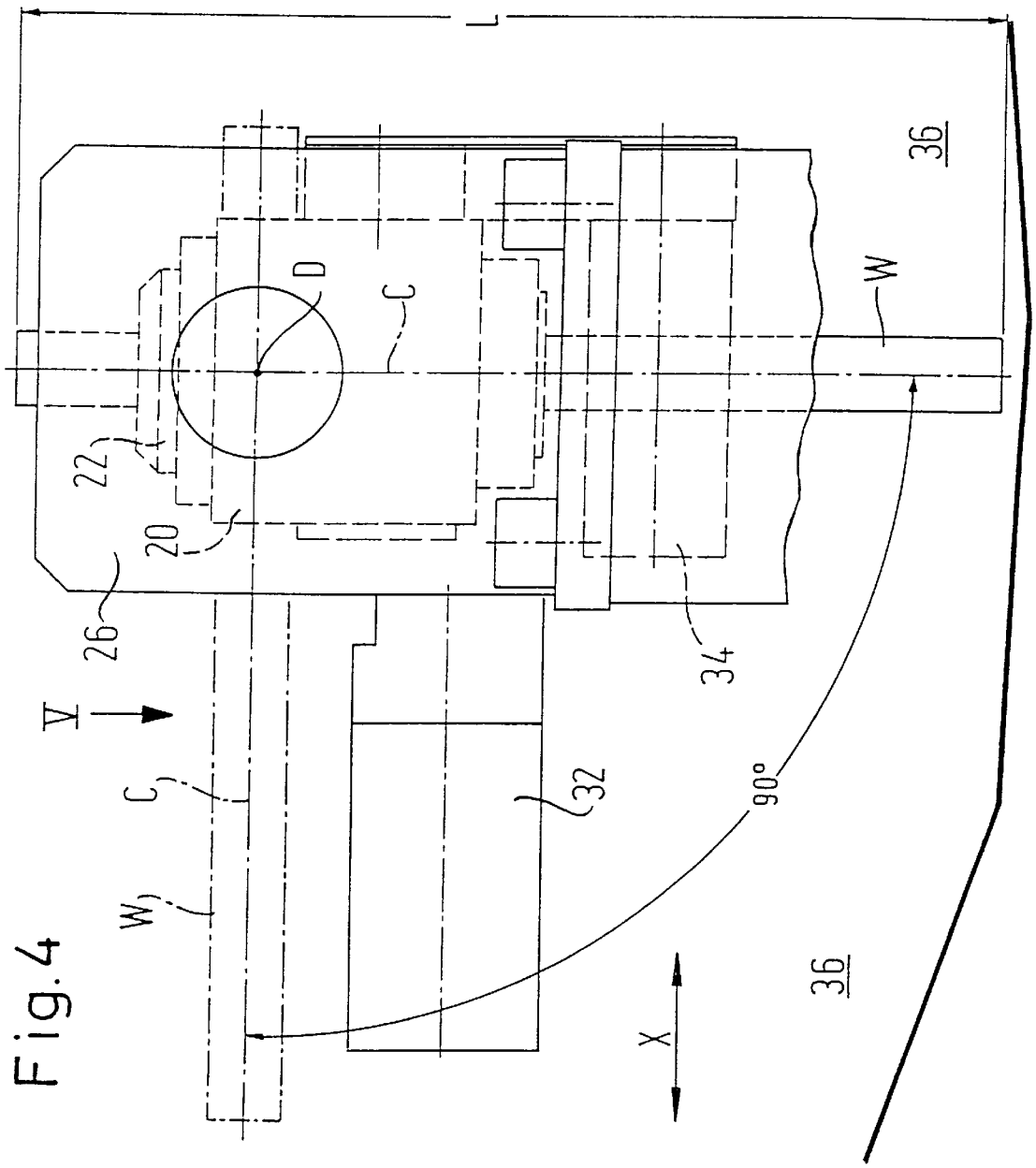
FIG. 4 is an enlarged cutout of FIG. 3.
Figure 5:
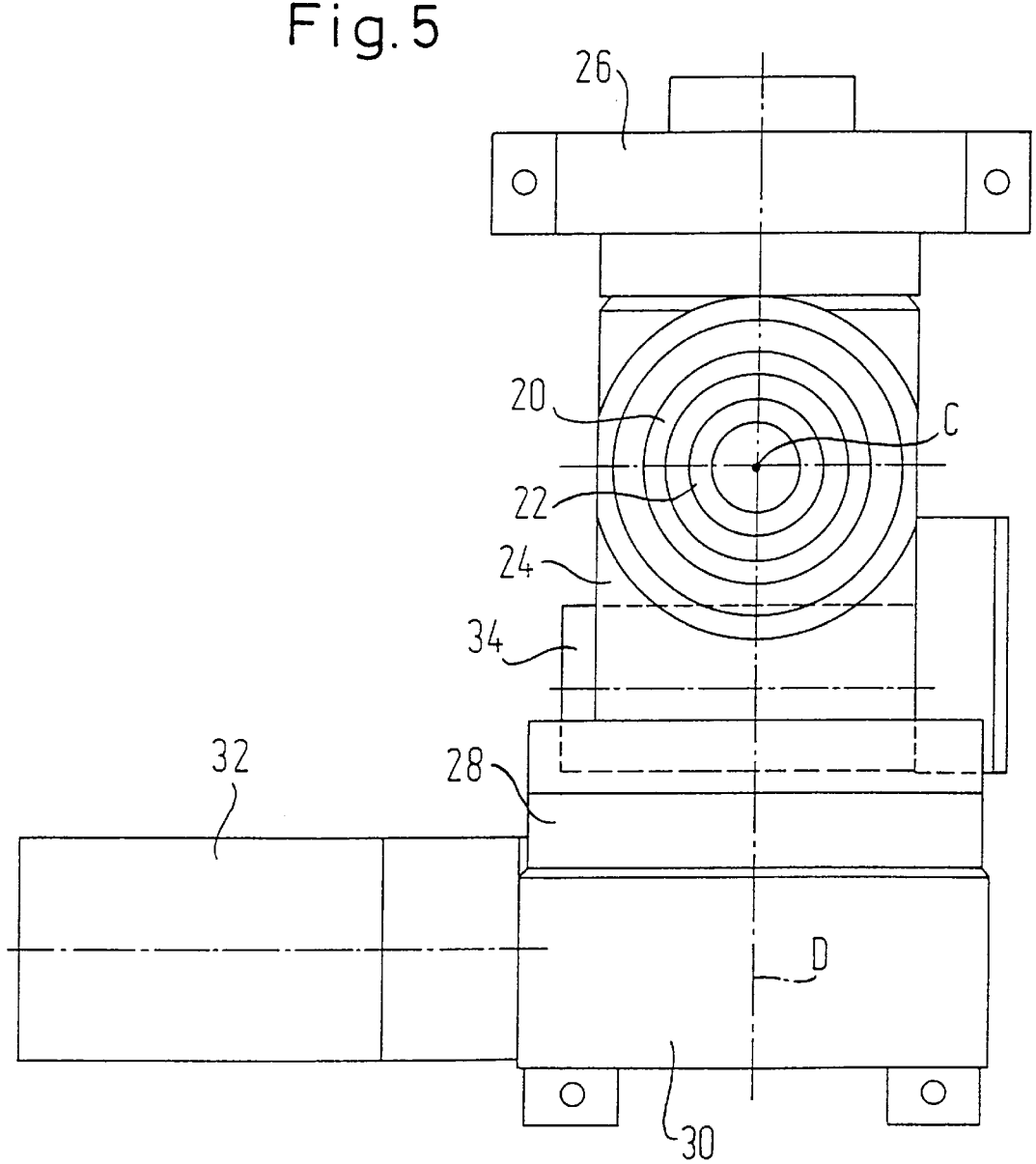
FIG. 5 is the top plan view in the direction of arrow V in FIG. 4.
Figure 6:
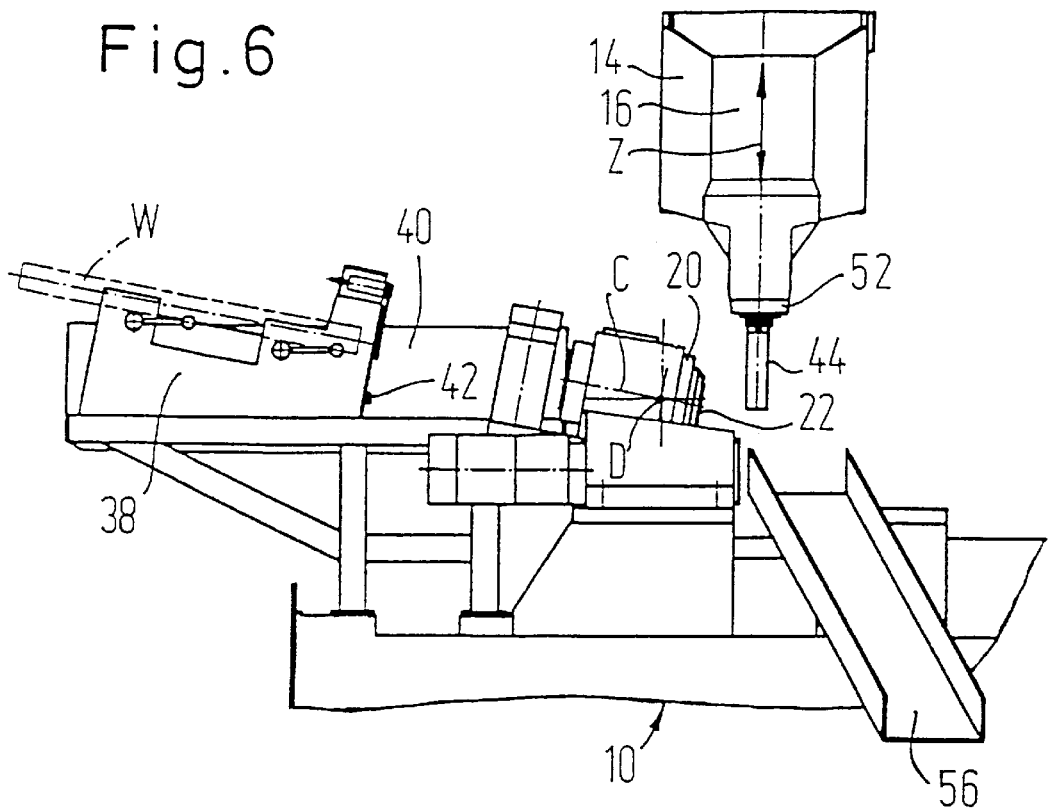
FIGS. 6 to 12 are very schematic front views of the drilling and milling mechanism in seven consecutive phases of machining a workpiece.

As shown in FIGS. 1–5, the drilling and milling mechanism comprises a machine bed 10 on which a movable column 12 is adjustable in controlled fashion in a horizontal plane, namely in a longitudinal direction X and a transverse direction Y. A vertical slide 14 carrying a spindle unit 16 with a vertical tool spindle 18 and being adjustable in controlled fashion along the spindle axis Z is mounted on the movable column 12. The drilling and milling mechanism in the first place is intended for producing workpieces W1 from material rods W having a square or other polygonal profile but also from circular material rods having a diameter of, for example, up to 60 mm, and for largely finishing these workpieces.

A workpiece support 20 including a clamping means 22 of conventional kind, for instance in the form of a spring collet or multiple jaw chuck, is provided to hold, rotate, and pivot a material rod W. The clamping means 22 defines a clamping axis C with which the axis of the material rod W coincides and along which the material rod can be pushed step by step through the workpiece support 20 and the clamping means 22, namely in FIGS. 1, 3, 4, and 6 to 12 from left to right. The workpiece support 20 is supported for rotation about the clamping axis C in a bridge 24 located between two bearing blocks 26 and 28, which are secured to the machine bed 10, and forming part of a pivot table 30. The pivot table 30 is pivotable about a pivot axis D by means of a numerically controlled pivot drive means 32, the pivot axis D extending parallel to the transverse direction Y, i.e. horizontally in the embodiment shown, and intersecting the clamping axis C at right angles. Together with the clamping means 22 the workpiece support 20 is rotatably adjustable about the clamping axis C by means of a numerically controlled rotary drive means 34. In addition, it is rotatable at selectable rotational speed of from 4000 to 6000 revolutions per minute, for example, so that the material rod W may be subjected to lathe work besides the usual drilling and milling operations.

The bearing blocks 26 and 28 are so high and mounted on such a base that a pivot space 36 is left free between them which permits a material rod W of sufficient rod length L for a plurality of workpieces W1 to be made from it, e.g. 800 or 1000 mm, to be swung into vertical alignment, as illustrated in FIGS. 1 to 5 and 10.

Introduction of a material rod W each into the clamping means 22 is facilitated by a rod guide means 38 equipped with conventional prismatic guides and positioned upstream of the clamping means in the left part of the drilling and milling mechanism, as seen in FIGS. 1, 3, 4, and 6 to 12. The rod guide means 38 rests on the machine bed 10 at an adjustable level and inclined downwardly to the right. The rod guide means 38 is arranged so as to be exposed in order to permit utilizing a crane, if necessary, to deposit a material rod W on it. Moreover, a supply means 40 is mounted on the machine bed 10. In the embodiment shown it comprises a pneumatic piston and cylinder unit including a feed finger 42 which is adapted to engage the rear end of the material rod W, the left end in FIGS. 1 and 3, in order to push the same forward.

A plurality of tools are kept ready for the tool spindle 18, among them a stop 44, a drill, a milling cutter 48, one or more lathe tools 46, and a circular saw 50, each of them being clamped in an exchangeable tool holder 52. The drilling and milling mechanism illustrated further comprises a tool magazine 54 embodied by a chain-type magazine in which the tool holders 52 holding the tools which happen not to be needed are kept ready in proper order for their next assignment.

Finally, the drawings show a workpiece chute 56, a chip conveyor 58 of conventional structure, and a switchbox 60 which, among others, contains numerical controls for the movements described above.

FIGS. 6 to 12 show how a material rod W is processed to render workpieces W1. For example, the material rod W has a square profile with a side length of 50 mm and a total length of 800 mm which is sufficient to make twenty workpieces, for instance. As follows from FIG. 6, the workpiece support 20 is moved by the pivot drive means 32 into a position which is inclined downwardly to the right with respect to the longitudinal direction X and parallel to the rod guide means 38, and the material rod W is deposited on the rod guide means 38 after the height thereof has been adjusted so that the rod axis will be aligned with the clamping axis C of the clamping means 22.

Figure 7:
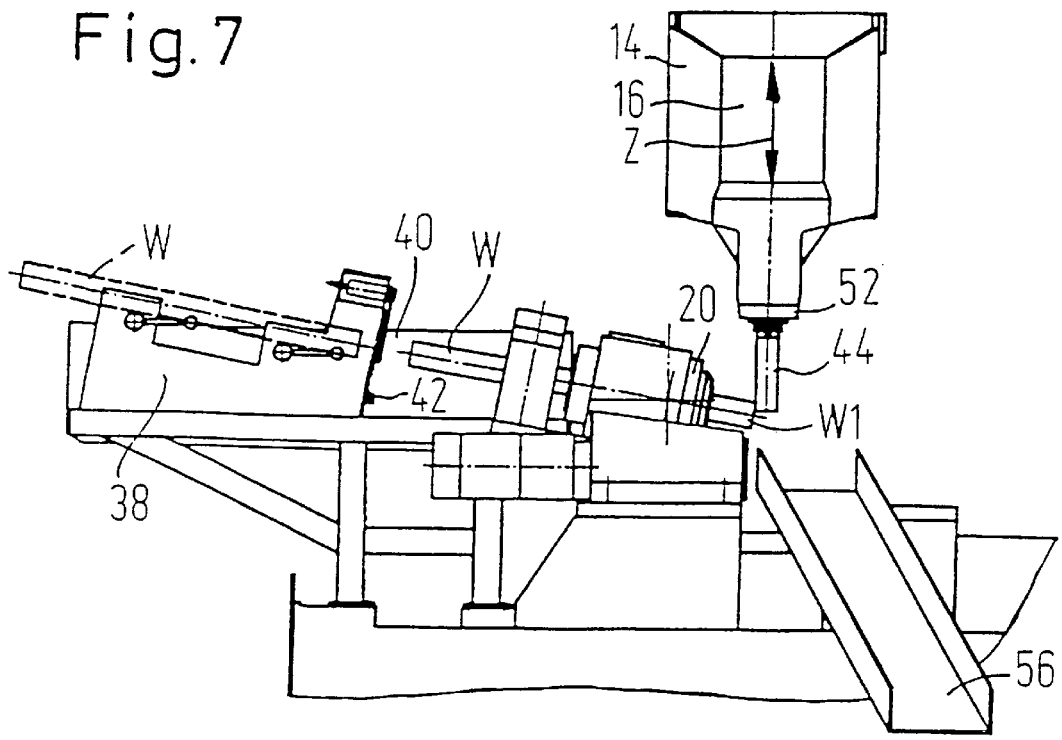

Thereupon the material rod W on the rod guide means 38 is pushed manually to the right and downwards into and through the clamping means 22, as seen in FIG. 7, so that the front portion of the material rod W intended to become the first workpiece W1 projects to the right out of the clamping means 22 and abuts against a stop 44. The stop 44 and its tool holder 52 have been fixed in position on the tool spindle 18 for this purpose. The rear end of the material rod W has left the rod guide means 38; the latter is at a distance in the order of the length L of the material rod W from the pivot axis D so that the subsequent movements of the material rod W cannot be obstructed by the rod guide means 38.

Figure 8:
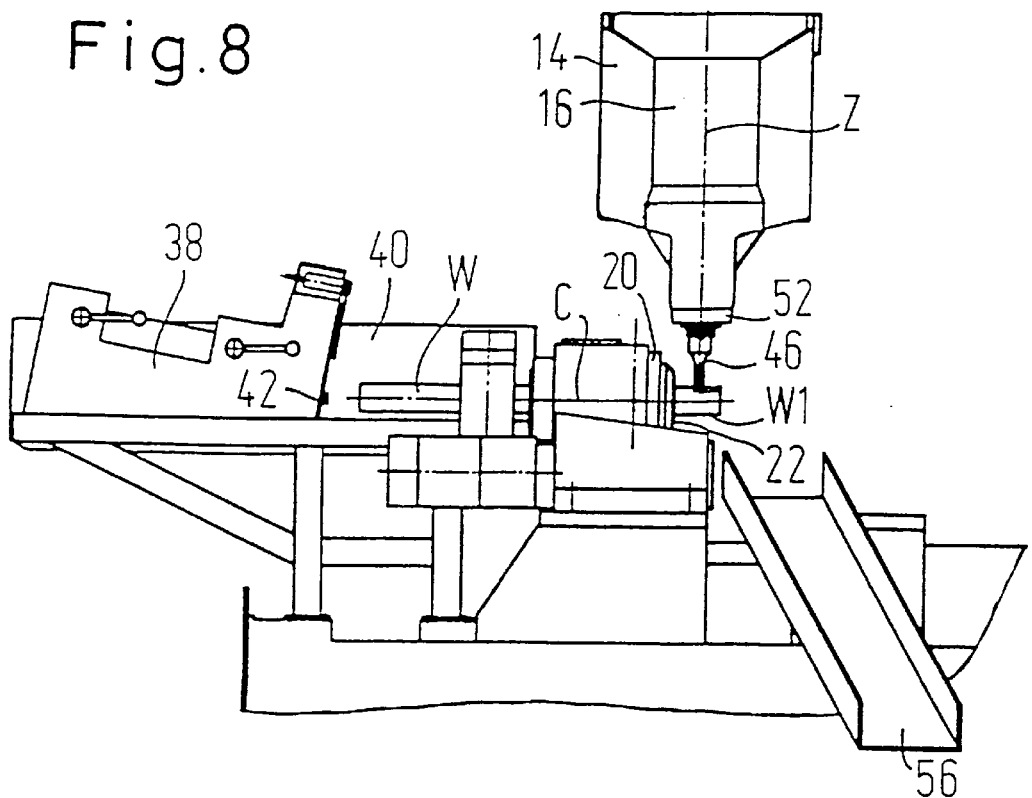

According to FIG. 8, the workpiece support 20 then is pivoted into a starting position at which the clamping axis C extends in parallel with the longitudinal axis X. In this starting position the material rod W is rotated at high speed, for example, so that lathe work can be carried out on it by means of lathe tools 46, as shown in FIG. 8, and the like which do not rotate themselves. Subsequently, the material rod W, continuing to hold its horizontal position according to FIG. 8, is moved under numerical control into various rotary angle positions so that it can be subjected to drilling and milling work.

Figure 9:
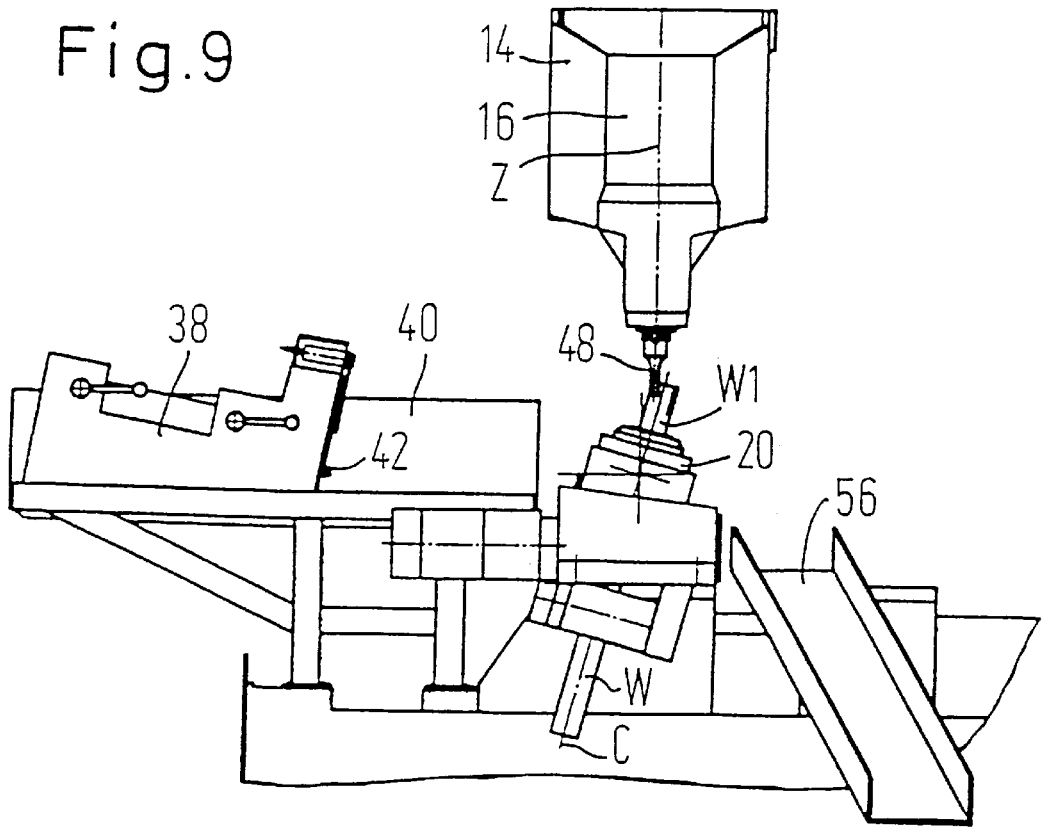

Following that, the workpiece support 20 is pivoted according to FIG. 9 into a position at which the clamping axis C is directed obliquely upwardly. In this position further drilling work is carried out and/or milling work is done if the workpiece support 20 is at standstill or rotates about the clamping axis C.

Figure 10:
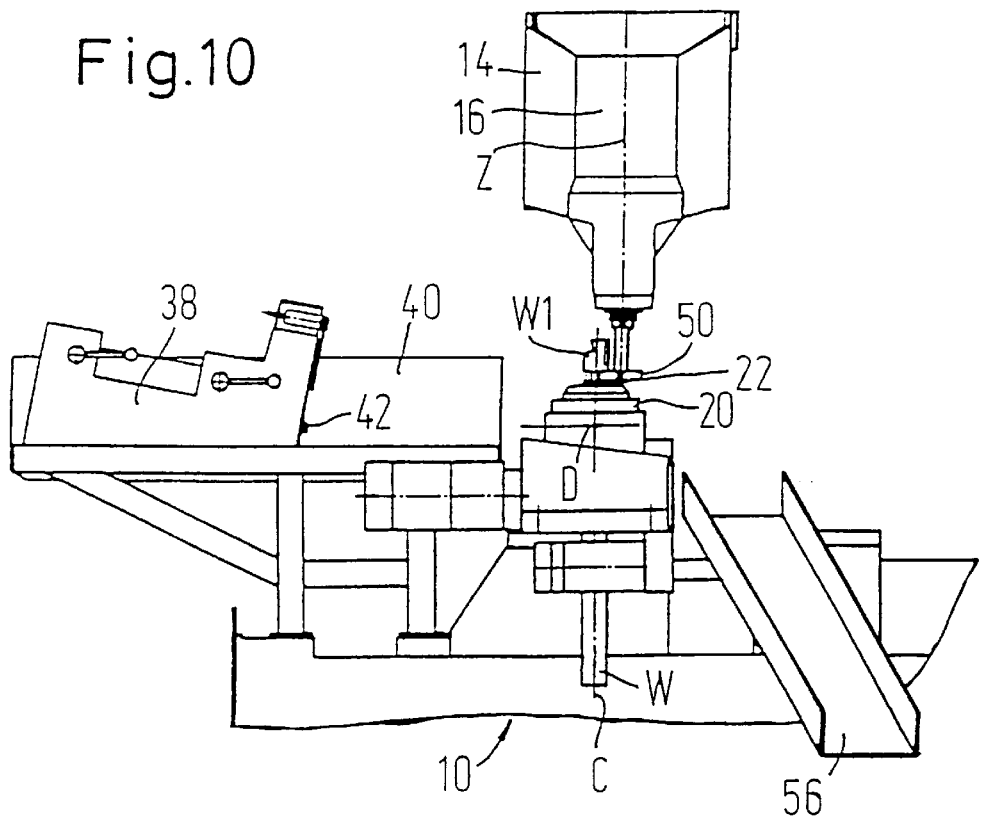

Thereafter, the workpiece support 20 is pivoted into a vertical position of the clamping axis C, according to FIG. 10, and the first workpiece W1, practically finished, is severed to a great extent, but not yet entirely, from the remainder of the material rod W by a circular saw 50 which now is fastened to the tool spindle 18.

Figure 11:
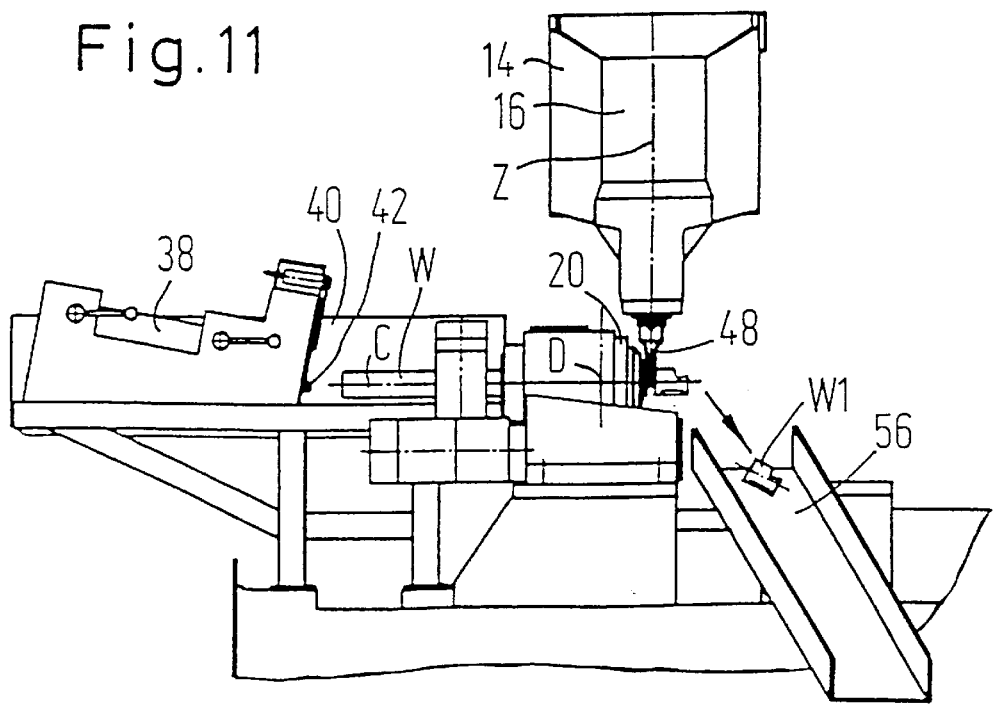

Finally, according to FIG. 11, the workpiece support 20 is pivoted back to horizontal orientation of the clamping axis C and the workpiece W1 is separated completely from the remainder of the material rod W by a milling cutter 48 so that the workpiece W1 will fall into the workpiece chute 56. If it is required that the severing and/or machining of the rear of the workpiece W1 be accomplished totally free of burrs, bracket means of conventional kind may be provided to receive the workpiece W1 for such machining to be carried out on its back.

Figure 12:
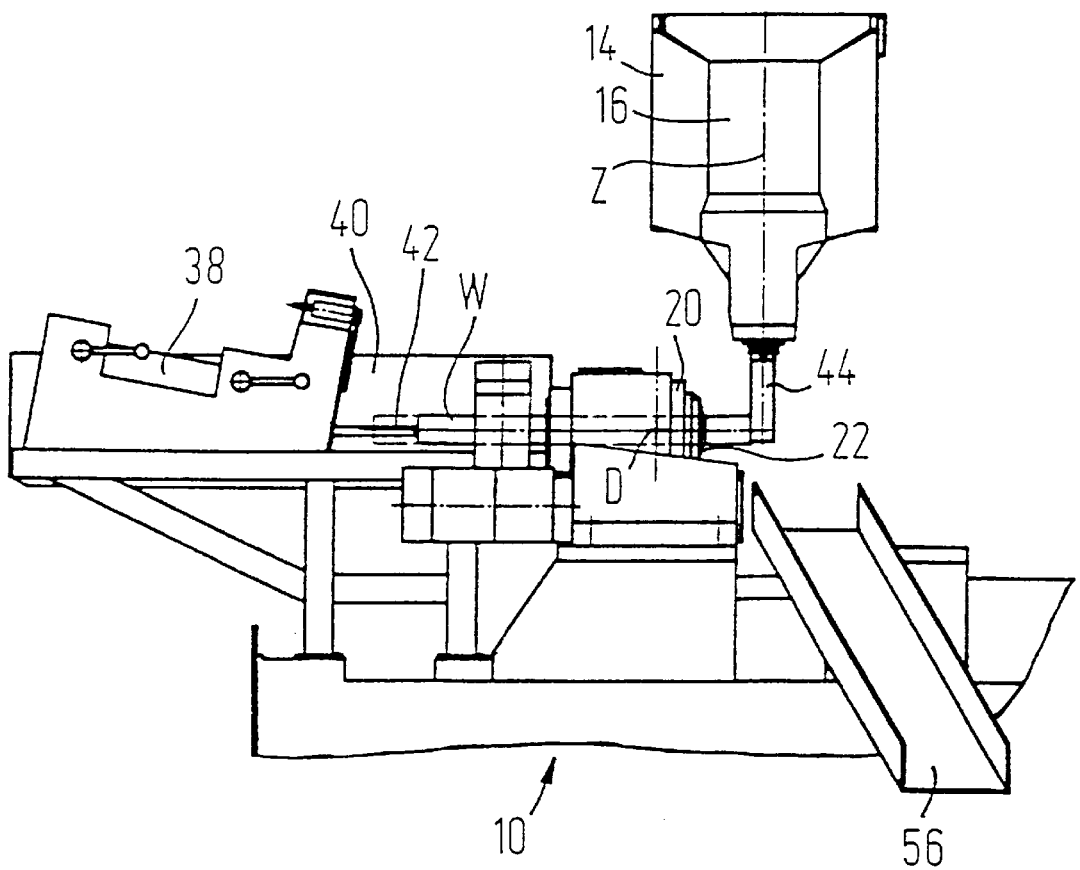

According to FIG. 12, the next operating cycle begins by re-inserting the stop 44 in the tool spindle 18 and having the material rod W advanced by the supply means 40, the feed finger 42 of which abuts against the back of the material rod, until the front end of the material rod W hits the stop 44. Then the feed finger 42 is retracted so far that it can no longer touch the material rod W in the further course of the operating cycle. Preferably, the feed finger 42 always is moved automatically into its rear terminal position as soon as the material rod W has been advanced.

What is claimed is:

1. A drilling and milling mechanism for processing material rods to individual workpieces, comprising:

a machine bed which defines a longitudinal direction and a transverse direction;

a movable column which is adjustable longitudinally and transversely on the machine bed in controlled fashion;

at least one tool spindle which is adjustable in controlled fashion on the movable column along a spindle axis extending substantially perpendicularly to both the longitudinal direction and the transverse direction;

a workpiece support defining a clamping axis about which the workpiece support is adjustable by rotation in controlled fashion and including a clamping means through which a material rod can be pushed and in which the material rod can be clamped, a front portion of the material rod constituting the workpiece to be machined being disposed in a working range of the tool spindle; and a supply means for pushing the material rod through the clamping means, wherein the workpiece support is pivotable in controlled fashion about a pivot axis extending substantially perpendicularly to both the clamping axis and the spindle axis in an area which reaches at least from a position of the clamping axis normal to the spindle axis to a position of the clamping axis parallel to the spindle axis, wherein the machine bed comprises a pivot space into which an end portion of the material rod remote from the workpiece to be machined can be swung, and wherein the supply means is movable into a position at which the supply means does not obstruct a pivoting movement of the material rod.

2. The drilling and milling mechanism as claimed in claim 1, wherein the pivot axis of the workpiece support intersects the clamping axis thereof.

3. The drilling and milling mechanism as claimed in claim 2, wherein the workpiece support is adapted to be driven in rotation about the clamping axis at a rotational speed which is sufficient for lathe work to be done by a lathe tool supported by said tool spindle.

4. The drilling and milling mechanism as claimed in claim 1, wherein the workpiece support is pivotable into a receiving position at which the clamping axis is inclined downwardly with respect to a direction in which the material rod is pushed through the clamping means, and wherein a rod guide means which is inclined accordingly and leaves free the pivot space is positioned upstream of the workpiece support.

5. The drilling and milling mechanism as claimed in claim 4, wherein the workpiece support is adapted to be driven in rotation about the clamping axis at a rotational speed which is sufficient for lathe work to be done by a lathe tool supported by said tool spindle.

6. The drilling and milling mechanism as claimed in claim 1, wherein the workpiece support is adapted to be driven in rotation about the clamping axis at a rotational speed which is sufficient for lathe work to be done by a lathe tool supported by said tool spindle.

* * * * *